United States Patent
Petkus et al.

(10) Patent No.: US 9,735,405 B1
(45) Date of Patent: Aug. 15, 2017

(54) VEHICLE BATTERY PACK SYSTEM AND CABLE BRACKET

(71) Applicants: Michael J Petkus, Clarkston, MI (US); Constantine J Nicolopoulos, Columbus, MI (US)

(72) Inventors: Michael J Petkus, Clarkston, MI (US); Constantine J Nicolopoulos, Columbus, MI (US)

(73) Assignee: Ralph E. Smith, Auburn Hills, MI (US)

( * ) Notice: Subject to any disclaimer, the term of this patent is extended or adjusted under 35 U.S.C. 154(b) by 29 days.

(21) Appl. No.: 15/041,400

(22) Filed: Feb. 11, 2016

(51) Int. Cl.
*H01M 2/10* (2006.01)
*H01M 2/20* (2006.01)
*H02G 3/02* (2006.01)

(52) U.S. Cl.
CPC ....... *H01M 2/1083* (2013.01); *H01M 2/1077* (2013.01); *H01M 2/20* (2013.01); *H02G 3/02* (2013.01); *H01M 2/206* (2013.01); *H01M 2220/20* (2013.01)

(58) Field of Classification Search
CPC .... H01M 2/1083; H01M 2/1077; H01M 2/20; H01M 2220/20; H01M 2/206; H02G 3/02
See application file for complete search history.

(56) References Cited

U.S. PATENT DOCUMENTS

| 4,131,257 | A | 12/1978 | Sterling |
| 4,325,598 | A | 4/1982 | Leonardo |
| 5,545,848 | A | 8/1996 | Lin |
| 6,297,447 | B1 | 10/2001 | Burnett et al. |
| 7,306,476 | B2 | 12/2007 | Gerlich et al. |
| 8,410,365 | B2 | 4/2013 | Ogawa et al. |
| 2004/0159751 | A1 | 8/2004 | Boon et al. |
| 2008/0248378 | A1* | 10/2008 | Mcguire ............... H01M 2/206 429/99 |
| 2014/0308561 | A1* | 10/2014 | Goesmann ............ H01M 2/206 429/121 |
| 2015/0037640 | A1* | 2/2015 | Pinon ...................... H01M 2/10 429/99 |
| 2015/0037647 | A1* | 2/2015 | Nguyen .............. H01M 10/625 429/120 |

(Continued)

OTHER PUBLICATIONS

B&R, "0AC301.9," Webside Available: http://www.br-automation.com/en/products/accessories/miscellaneous/0ac3019, accessed on Jun. 17, 2015.

*Primary Examiner* — Stewart Fraser
(74) *Attorney, Agent, or Firm* — Ralph E. Smith

(57) ABSTRACT

A vehicle battery pack system includes a cable bracket that has a conductive base, and a clamp. The base includes a mount, base arm, and base bridge. The mount is configured to be mounted to an electrical ground. The base bridge defines an aperture and fixedly couples the mount to the base arm. The base arm has a concave surface. The clamp includes a clamp arm and clamp bridge. The clamp bridge defines an aperture. The clamp arm is fixedly coupled to the clamp bridge and has a concave surface opposing the concave surface of the base arm. A fastener is received through the apertures to couple the clamp to the base. A protrusion extends radially inward from at least one of the concave surfaces. The protrusion is coupled for electrical communication with the mount to transmit electricity between the protrusion and the electrical ground.

20 Claims, 5 Drawing Sheets

(56) References Cited

U.S. PATENT DOCUMENTS

| 2015/0037648 A1* | 2/2015 | Nguyen | H01M 10/625 |
| | | | 429/120 |
| 2015/0037662 A1* | 2/2015 | Pinon | H01M 2/0237 |
| | | | 429/179 |

\* cited by examiner

VEHICLE BATTERY PACK SYSTEM AND CABLE BRACKET

FIELD

The present disclosure relates to a vehicle battery pack system and a cable bracket.

BACKGROUND

This section provides background information related to the present disclosure which is not necessarily prior art.

Hybrid electric vehicles and fully electric vehicles typically include a high voltage electrical system (e.g. 48 volts) and a low voltage electrical system (e.g. 12 volts). The high voltage electrical system typically includes a high voltage energy storage unit (e.g. a battery or super capacitor) and high voltage cables electrically coupled to the energy storage unit. The high voltage cables are typically configured to carry electrical power at high voltages (e.g. 48 volts). In order to reduce electrical noise and interference, the high voltage cables are typically constructed as having a central core wire, concentrically wrapped in a layer of insulating material that is concentrically wrapped in a layer of shielding material. The layer of shielding material can also be concentrically wrapped in another layer of insulating material. The layer of shielding material generally is electrically coupled to an electrical ground (e.g. vehicle frame, or ground circuit).

Tight packaging of components within the vehicles can require the cables to bend near terminal connections. These bends can place strain on the terminal connections and the cables. Vibrations of the cables relative to their terminal connections can also add to the strain on the terminal connections and the cables.

SUMMARY

This section provides a general summary of the disclosure, and is not a comprehensive disclosure of its full scope or all of its features.

In accordance with an aspect of the present disclosure, a cable bracket includes a conductive base member, a conductive clamp member, a clamping fastener, and at least one conductive protrusion. The base member includes a mount portion, a high voltage cable base arm, and a base bridge. The mount portion is configured to be mounted to an electrical ground. The base bridge has an aperture and fixedly couples the mount portion to the high voltage cable base arm. The high voltage cable base arm has a concave inner surface. The clamp member includes a high voltage cable clamp arm and a clamp bridge. The clamp bridge defines an aperture. The high voltage cable clamp arm is fixedly coupled to the clamp bridge and has a concave inner surface that opposes the concave inner surface of the high voltage cable base arm. The clamping fastener is received through the apertures of the base bridge and the clamp bridge and secures the clamp member to the base member in electrical contact therewith. The at least one protrusion extends radially inward from one of the concave inner surface of the high voltage cable base arm or the concave inner surface of the high voltage cable clamp arm.

In accordance with an aspect of the present disclosure, the cable bracket further includes a mounting fastener. The mount portion includes an aperture. The mounting fastener is received through the aperture of the base bridge to connect the mount portion to the electrical ground.

In accordance with an aspect of the present disclosure, the cable bracket further includes at least one conductive protrusion extending radially inward from the other one of the concave inner surface of the high voltage cable base arm or the concave inner surface of the high voltage cable clamp arm.

In accordance with an aspect of the present disclosure, the high voltage cable base arm and the mount portion extend from different sides of the base bridge.

In accordance with an aspect of the present disclosure, the high voltage cable base arm and the mount portion extend from sides of the base bridge that are perpendicular to one another.

In accordance with an aspect of the present disclosure, the base member includes a low voltage cable base arm and the clamp member includes a low voltage cable clamp arm. The low voltage cable base arm is fixedly coupled to the base bridge and has a concave inner surface. The low voltage cable clamp arm is fixedly coupled to the clamp bridge and has a concave inner surface that opposes the concave inner surface of the low voltage cable base arm.

In accordance with an aspect of the present disclosure, the concave inner surfaces of the high voltage cable base arm and the high voltage cable clamp arm have a radius of curvature. The concave inner surfaces of the low voltage cable base arm and the low voltage cable clamp arm have a radius of curvature that is less than the radius of curvature of the high voltage cable base arm and the high voltage cable clamp arm.

In accordance with an aspect of the present disclosure, the concave inner surfaces of the low voltage cable base arm and the low voltage cable clamp arm are devoid of radially inward extending protrusions.

In accordance with an aspect of the present disclosure, the cable bracket further includes a prong that extends from one of the base member or the clamp member and is configured to engage a power source to inhibit movement of the cable bracket relative to the power source.

In accordance with an aspect of the present disclosure, the prong projects from one of the base bridge or the clamp bridge opposite from the mount portion.

In accordance with an aspect of the present disclosure, a vehicle battery pack system includes a power source, a high voltage cable, and a cable bracket. The power source includes a positive terminal and an electrical ground. The high voltage cable includes a conductive core, a conductive shielding layer, an insulating layer disposed between the core and the shielding layer, and a high voltage terminal end that is attached to the core and the high voltage terminal. The cable bracket includes a conductive base member, a conductive clamp member, a clamping fastener, and at least one protrusion. The base member includes a mount portion, a high voltage cable base arm, and a base bridge. The mount portion is mounted to the power source and coupled to the electrical ground for electrical communication therewith. The base bridge defines an aperture and fixedly couples the mount portion to the high voltage cable base arm. The high voltage cable base arm has a concave inner surface. The clamp member includes a high voltage cable clamp arm and a clamp bridge. The clamp bridge includes an aperture. The high voltage cable clamp arm is fixedly coupled to the clamp bridge and has a concave inner surface that opposes the concave inner surface of the high voltage cable base arm. The high voltage cable is received between the concave inner surfaces of the high voltage cable base arm and the high voltage cable clamp arm. The clamping fastener is received through the apertures of the base bridge and the clamp bridge and connects the clamp member to the base member. The at least one protrusion extends radially inward from one of the concave inner surface of the high voltage cable base arm or the concave inner surface of the high voltage cable clamp arm and contacts the shielding layer.

In accordance with an aspect of the present disclosure, the vehicle battery pack system further includes a mounting fastener. The mount portion defines an aperture. The mounting fastener is received through the aperture of the mount portion to attach the mount portion to the power source.

In accordance with an aspect of the present disclosure, the vehicle battery pack system further includes at least one protrusion extending radially inward from the other one of the concave inner surface of the high voltage cable base arm or the concave inner surface of the high voltage cable clamp arm and contacting the shielding layer. The at least one protrusion extending radially inward from the other one of the concave inner surface of the high voltage cable base arm or the concave inner surface of the high voltage cable clamp arm is coupled for electrical communication with the mount portion to transmit electricity between the shielding layer and the electrical ground.

In accordance with an aspect of the present disclosure, the high voltage cable base arm and the mount portion extend from different sides of the base bridge.

In accordance with an aspect of the present disclosure, the high voltage cable base arm and the mount portion extend from sides of the base bridge that are perpendicular to one another.

In accordance with an aspect of the present disclosure, the vehicle battery pack system further includes a low voltage cable that includes a conductive core, a low voltage terminal end, and an insulating layer that surrounds the core of the low voltage cable. The power source includes a low voltage terminal and the low voltage terminal end is attached to the core of the low voltage cable and the low voltage terminal. The base member includes a low voltage cable base arm and the clamp member includes a low voltage cable clamp arm. The low voltage cable base arm is fixedly coupled to the base bridge and has a concave inner surface. The low voltage cable clamp arm is fixedly coupled to the clamp bridge and has a concave inner surface that opposes the concave inner surface of the low voltage cable base arm. The low voltage cable is received between the concave inner surfaces of the low voltage base arm and the low voltage clamp arm.

In accordance with an aspect of the present disclosure, the high voltage cable has an outermost diameter that is greater than an outermost diameter of the low voltage cable.

In accordance with an aspect of the present disclosure, the concave inner surfaces of the low voltage cable base arm and the low voltage cable clamp arm are devoid of radially inward extending protrusions.

In accordance with an aspect of the present disclosure, the vehicle battery pack system further includes a prong that extends from the cable bracket and engages the power source to inhibit movement of the cable bracket relative to the power source.

In accordance with an aspect of the present disclosure, the prong projects from one of the base bridge or the clamp bridge.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

In accordance with an aspect of the present disclosure, a vehicle electric system has a cable bracket configured to relieve strain on cables near their terminal connections and to electrically ground the shielding of a shielded cable.

Figure 1:
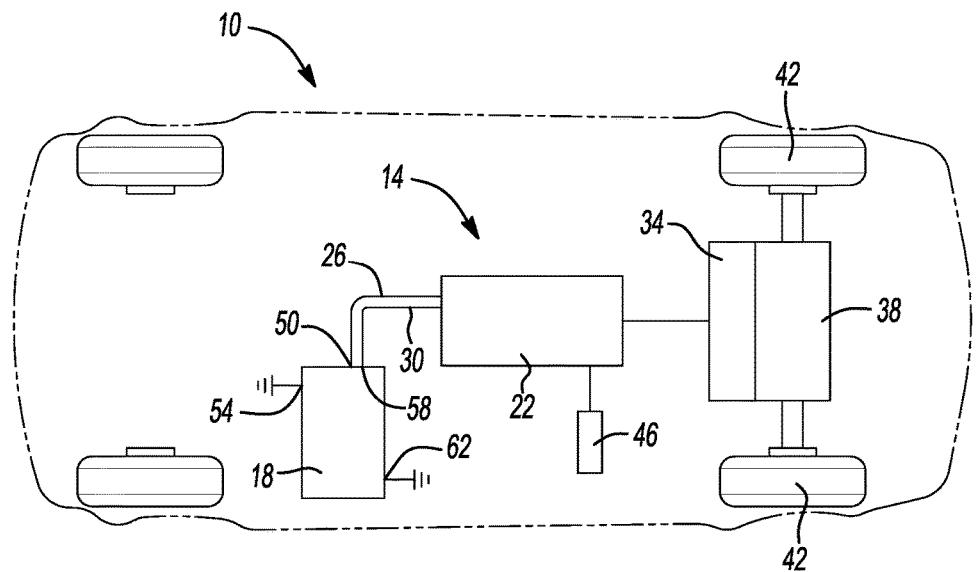
FIG. 1 is a schematic view of a vehicle including an electrical system in accordance with an aspect of the present disclosure.
Figure 2:
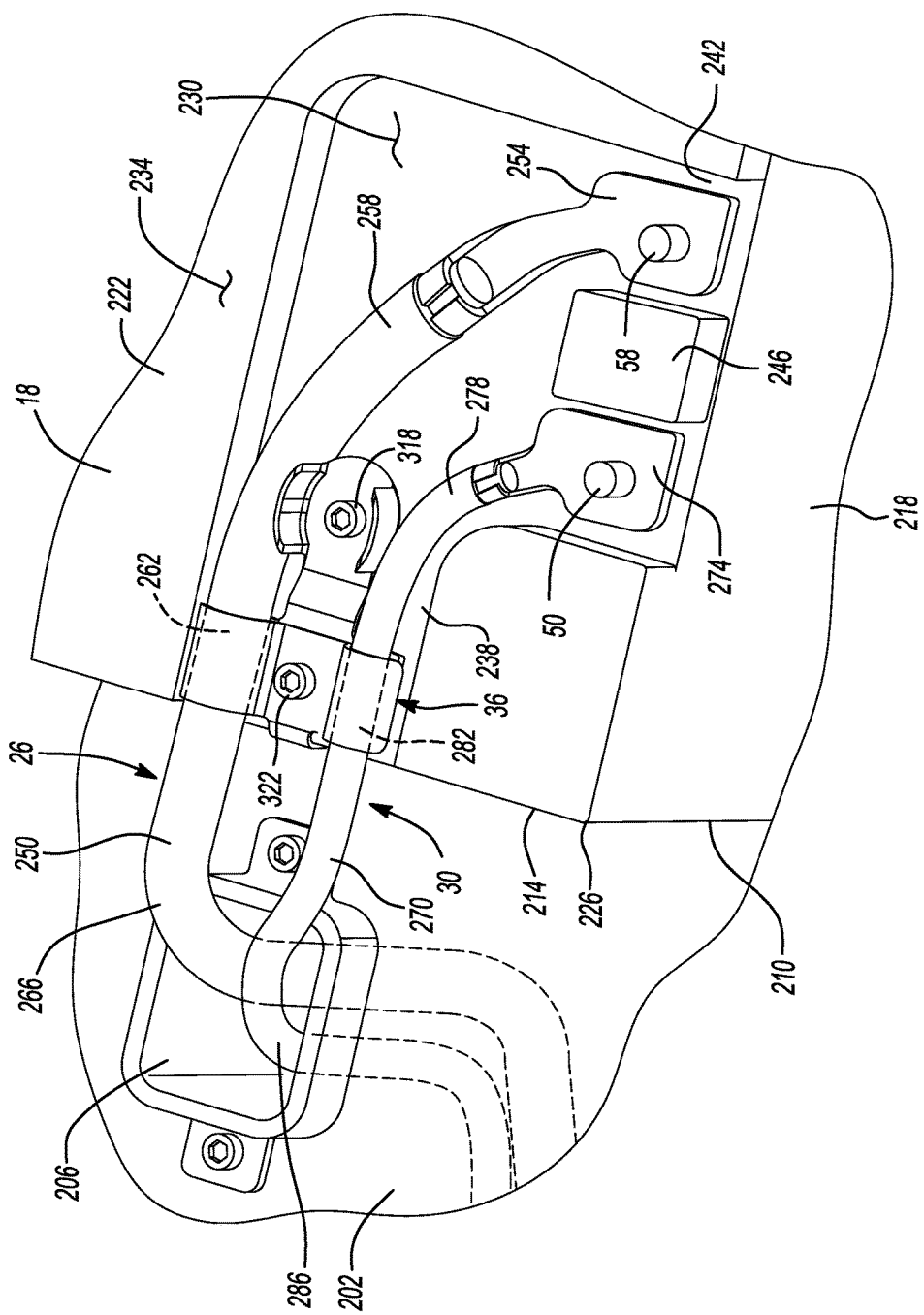
FIG. 2 is a perspective view of a portion of the electrical system of FIG. 1, illustrating a cable bracket of the electrical system.

With reference to FIG. 1, a schematic view of a vehicle 10 is illustrated. The vehicle 10 is any suitable type of vehicle, such as an automobile, truck, bus, recreational vehicle, military vehicle, or agricultural vehicle for example. The vehicle 10 includes an electrical system 14. The electrical system 14 includes a power source 18, a control module 22, a low voltage circuit 26, a high voltage circuit 30, an electric motor 34, and a cable bracket 36 (FIG. 2). In the example provided, the motor 34 is drivingly coupled to a transmission 38, which is drivingly coupled to a pair of drive wheels 42. In an example of an alternative construction, not specifically shown, the vehicle 10 includes a plurality of motors that are configured to individually drive one of the drive wheels 42. In another alternative construction, not specifically shown, the vehicle 10 is a hybrid vehicle and includes a secondary power plant (e.g., a combustion engine) configured to provide additional or separate power to the drive wheels 42 and/or recharge the power source 18.

The power source 18 is any suitable power source such as a battery, capacitor, or super capacitor for example, that is configured to store electrical power. The power source 18 includes a positive low voltage terminal 50, a negative low voltage terminal 54, a positive high voltage terminal 58, and a negative high voltage terminal 62. The positive low voltage terminal 50 is electrically coupled to the low voltage circuit 26 and the positive high voltage terminal 58 is electrically coupled to the high voltage circuit 30. In the example provided, the negative low voltage terminal 54 and the negative high voltage terminal 62 are electrically coupled to an electrical ground (e.g., a chassis of the vehicle), or a ground circuit.

The control module 22 is any suitable control device such as an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group)

that executes code; a memory circuit (shared, dedicated, or group) that stores code executed by the processor circuit; other suitable hardware components that provide the described functionality; or a combination of some or all of the above, such as in a system-on-chip for example. The control module 22 is electrically coupled to the power source 18 and the motor 34, and is configured to control delivery of electrical power between the motor 34 and the power source 18. In the example provided, the control module 22 is electrically coupled to the power source 18 and the motor 34 via the high voltage circuit 30. In the example provided, the high voltage circuit 30 is configured to carry a voltage of 48 volts.

In the example provided, the control module 22 is also electrically coupled to a low voltage system 46 via the low voltage circuit 26. The low voltage system 46 is any suitable device or plurality of devices such as lights, an instrument panel, vehicle controls, vehicle computer, or any other devices that use low voltage power. In the example provided, the low voltage power is 12 volts.

With additional reference to FIG. 2, a portion of the vehicle 10 is shown including a portion of the power source 18, the high voltage circuit 30, the low voltage circuit 26, and the cable bracket 36. In the example provided, the vehicle 10 also includes a bulkhead 202 (also commonly referred to as a firewall) and a port 206 through the bulkhead 202. In the example provided, the power source 18 is a battery that includes an outer casing 210, the positive low voltage terminal 50, the negative low voltage terminal 54 (FIG. 1), the positive high voltage terminal 58, and the negative high voltage terminal 62 (FIG. 1).

The outer casing 210 generally has a plurality of sides. In the example provided, the outer casing 210 has a first side 214, a second side 218, and a top side 222 that are generally perpendicular to each other to come together to form a corner 226 of the outer casing 210. The term "top" with reference to the top side 222, and similar spatial terms used herein, are used for ease of description with reference to the figures, and are not meant to be limiting. Such spatially relative terms may be intended to encompass different orientations of the device in use or operation in addition to the orientation depicted in the figures.

In the example provided, the top side 222 includes a recessed surface 230 that is recessed from a top surface 234 of the top side 222. The recessed surface 230 has a generally dog-legged shape having a cable receiving portion 238 that is open at the first side 214 and a terminal receiving portion 242 that intersects the cable receiving portion 238 and extends therefrom toward the second side 218. In the example provided, the terminal receiving portion 242 extends generally perpendicular to the cable receiving portion 238. The positive low voltage terminal 50 and the positive high voltage terminal 58 are located within the terminal receiving portion 242 of the recessed surface 230 proximate to the second side 218. In the example provided, the positive low voltage terminal 50 and the positive high voltage terminal 58 are spaced apart by a plateau 246 of the outer casing 210 that extends from the recessed surface 230.

The high voltage circuit 30 includes a high voltage power cable 250 having a high voltage terminal end 254. The high voltage terminal end 254 is fastened to the high voltage power cable 250 and to the positive high voltage terminal 58. The low voltage circuit 26 includes a low voltage power cable 270 having a low voltage terminal end 274. The low voltage terminal end 274 is fastened to the low voltage power cable 270 and to the positive low voltage terminal 50.

Figure 3:
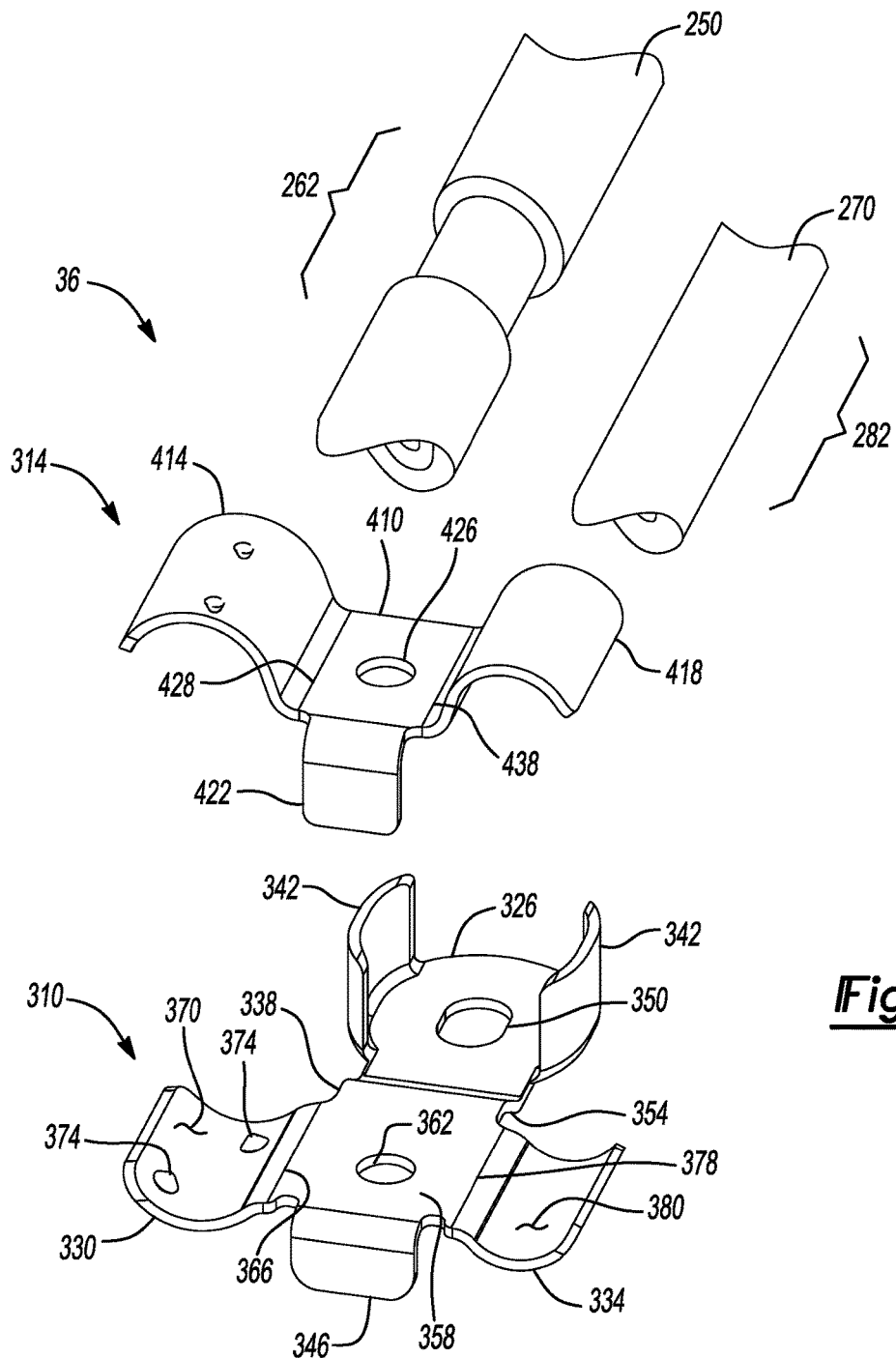
FIG. 3 is an exploded perspective view of the cable bracket of FIG. 2.
Figure 4:
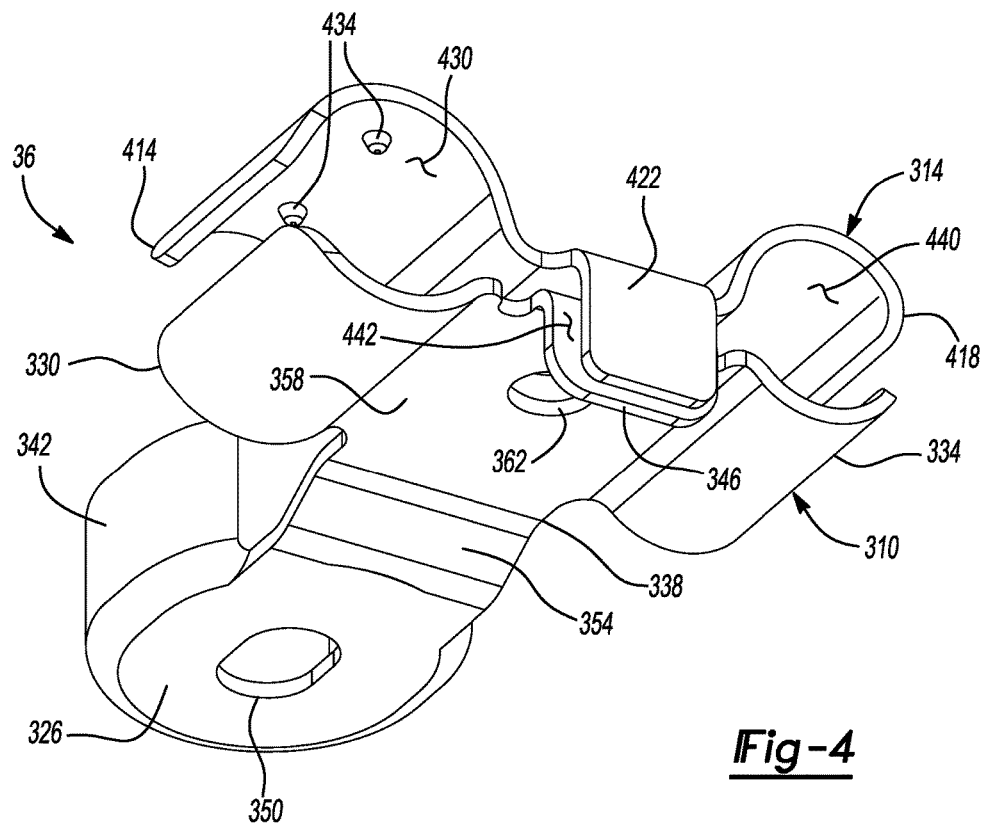
FIG. 4 is a perspective view of the bracket of FIG. 2.
Figure 5:
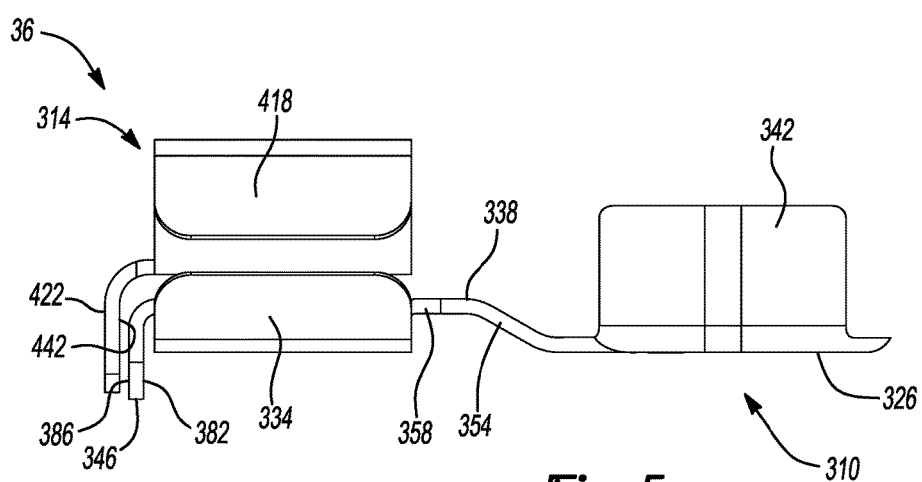
FIG. 5 is another perspective view of the cable bracket of FIG. 2.

With additional reference to FIGS. 3-5, the cable bracket 36 includes a conductive base member 310, a conductive clamp member 314, a mounting fastener 318 (FIG. 2), and a clamp fastener 322 (FIG. 2). The base member 310 includes a mount portion 326, a high voltage cable base arm 330, a low voltage cable base arm 334, and a base bridge 338. In the example provided, the base member 310 also includes a pair of guards 342 and a base prong 346. The base member 310 is formed of an electrically conductive material. The mount portion 326 is a generally flat surface that defines an aperture 350. In the example provided, the mount portion 326 abuts the recessed surface 230 (FIG. 2) within the cable receiving portion 238 (FIG. 2) and the mounting fastener 318 is received through the aperture 350 to fasten the mount portion 326 to the outer casing 210 (FIG. 2). The mounting fastener 318 is any suitable type of fastener such as a machine screw, for example. In the example provided, the mounting fastener 318 is formed of an electrically conductive material.

The guards 342 are disposed about the periphery of the mount portion 326 and extend generally perpendicularly away from the mount portion 326, e.g., away from the recessed surface 230 (FIG. 2). The guards 342 are curved to be convex facing away from the aperture 350.

The base bridge 338 has a ramped portion 354 and a flat portion 358. The ramped portion 354 extends from the mount portion 326, generally toward the first side 214 (FIG. 2) of the outer casing 210 (FIG. 2) and away from the recessed surface 230 to the flat portion 358. In the example provided, the flat portion 358 is generally flat, parallel to the recessed surface 230, and defines an aperture 362.

The high voltage cable base arm 330 extends from one side 366 of the flat portion 358. The high voltage cable base arm 330 has a generally "C" or "U" shape having a concave inner surface 370. The concave inner surface 370 of the high voltage cable base arm 330 includes a plurality of protrusions 374 that extend radially inward from the concave inner surface 370. In the example provided, the protrusions 374 are generally conical in shape. While two protrusions 374 are shown, alternative constructions (not specifically shown) include additional protrusions.

The low voltage cable base arm 334 extends from an opposite side 378 of the flat portion 358 as the high voltage cable base arm 330. The low voltage cable base arm 334 has a generally "C" or "U" shape having a concave inner surface 380. In the example provided, the concave inner surface 380 of the low voltage cable base arm 334 is smooth and has a smaller radius of curvature than the concave inner surface 370 of the high voltage cable base arm 330.

The base prong 346 extends generally perpendicularly from the flat portion 358 toward the recessed surface 230 (FIG. 2). In the example provided, the base prong 346 has an inner surface 382 and an outer surface 386. The inner surface 382 of the base prong 346 abuts the first side 214 (FIG. 2) to prevent the cable bracket 36 from rotating relative to the outer casing 210 about the mounting fastener 318.

The clamp member 314 includes a clamp bridge 410, a high voltage clamp arm 414, a low voltage clamp arm 418, and a clamp prong 422. In the example provided, the clamp member 314 is formed of an electrically conductive material. The clamp bridge 410 extends between the high voltage clamp arm 414 and the low voltage clamp arm 418. The clamp bridge 410 defines an aperture 426 that is configured to align with the aperture 362 of the base bridge 338. The apertures 362, 426 are configured to receive a portion of the clamp fastener 322 therethrough to attach the base bridge 338 to the clamp bridge 410. The clamp fastener 322 is any suitable type of fastener, such as a bolt and nut for example. In the example provided, the clamp fastener 322 is formed of an electrically conductive material.

The high voltage clamp arm 414 extends from one side 428 of the clamp bridge 410. The high voltage clamp arm 414 has a generally "C" or "U" shape having a concave inner surface 430 that faces toward the concave inner surface 370 of the high voltage cable base arm 330. In the example provided, the concave inner surface 430 of the high voltage clamp arm 414 includes a plurality of protrusions 434 that extend radially inward from the concave inner surface 430. In the example provided, the protrusions 434 are generally conical in shape and offset from the protrusions 374 of the high voltage cable base arm 330. While two protrusions 434 are shown, alternative constructions (not specifically shown) include additional protrusions. In the example provided, the concave inner surface 430 of the high voltage clamp arm 414 has a radius of curvature that is the same as the high voltage cable base arm 330.

The low voltage clamp arm 418 extends from an opposite side 438 of the clamp bridge 410 as the high voltage clamp arm 414. The low voltage clamp arm 418 has a generally "C" or "U" shape having a concave inner surface 440. In the example provided, the concave inner surface 440 of the low voltage clamp arm 418 is smooth and has a smaller radius of curvature than the concave inner surface 430 of the high voltage clamp arm 414. In the example provided, the low voltage clamp arm 418 has a radius of curvature that is the same as the low voltage cable base arm 334.

The clamp prong 422 extends generally perpendicularly from the clamp bridge 410 toward the recessed surface 230 (FIG. 2). In the example provided, the clamp prong 422 has an inner surface 442 that opposes the outer surface 386 of the base prong 346. In one aspect of the invention, the inner surface 442 abuts the outer surface 386 to prevent the clamp member 314 from rotating relative to the base member 310 about the clamp fastener 322 when fastened together as shown in FIG. 2.

Figure 6:
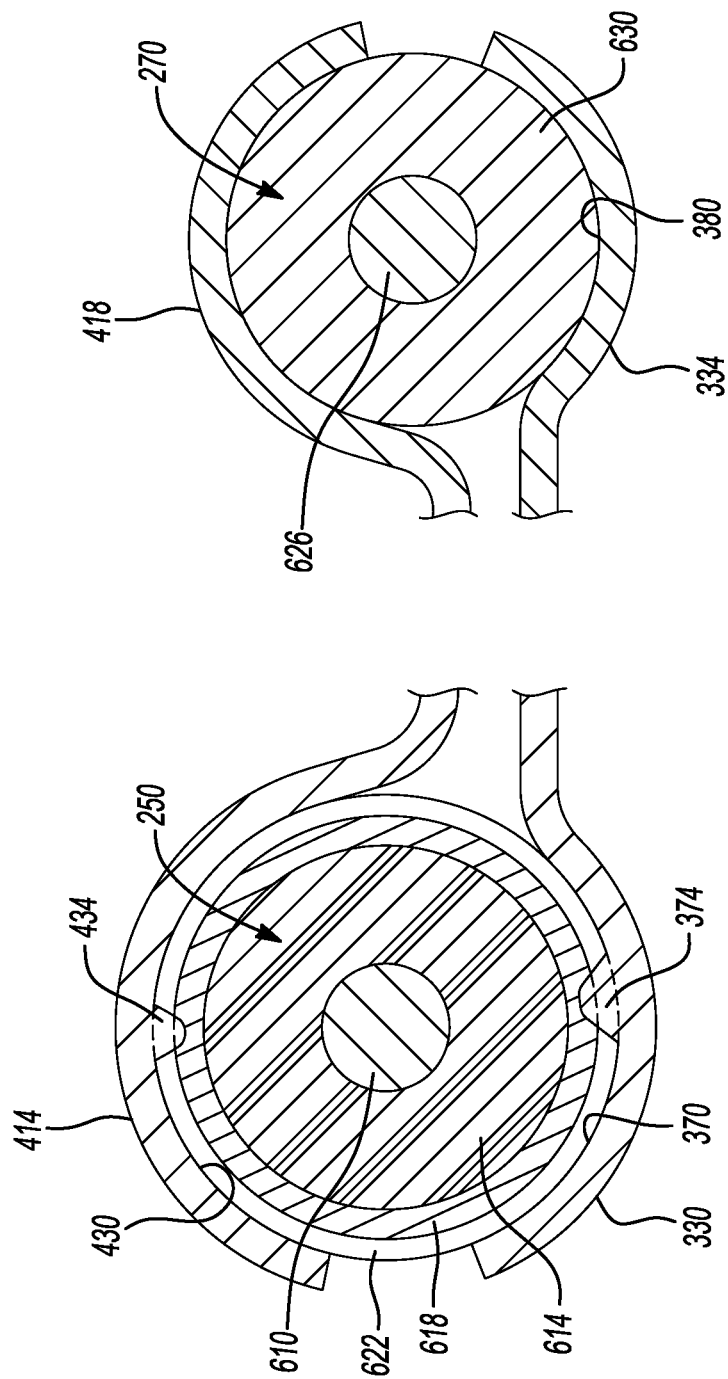
FIG. 6 is a sectional view of the cable bracket of FIG. 2.

With additional reference to FIG. 6, the high voltage power cable 250 includes a core 610, an inner insulating layer 614, a shielding layer 618, and an outer insulating layer 622. The core 610 is an electrically conductive material configured to transmit high voltage electrical power. The inner insulating layer 614 is concentrically disposed about the core 610 and is an electrically insulating material configured to electrically isolate the core 610 from the shielding layer 618. The shielding layer 618 is concentrically disposed about the inner insulating layer 614 and is an electrically conductive material configured to transmit electrical current. The outer insulating layer 622 is concentrically disposed about the shielding layer 618 and is an electrically insulating material.

Returning to FIGS. 2 and 3, the high voltage terminal end 254 is attached to the core 610 (FIG. 6). The high voltage terminal end 254 is made of an electrically conductive material that conducts high voltage electrical power between the core 610 (FIG. 6) and the positive high voltage terminal 58. A segment 258 of the high voltage power cable 250 is attached to the high voltage terminal end 254 and bends or curves from the high voltage terminal end 254 to another segment 262 of the high voltage power cable 250. The segment 262 is received between the concave inner surfaces 370, 430 of the high voltage cable base arm 330 and the high voltage clamp arm 414 to be clamped therebetween to prevent axial, lateral, and rotational movement of the segment 262. Another segment 266 of the high voltage power cable 250 bends or curves from the segment 262, to other components (not specifically shown) of the high voltage circuit 30, to the motor 34 (FIG. 1), and/or the control module 22 (FIG. 1). The high voltage power cable 250 bends on one or both sides of the segment 262. In the example provided, the high voltage power cable 250 bends at approximately 90° to pass through the port 206 mounted to the bulkhead 202 of the vehicle 10.

In operation, the bend of the segment 258 and the bend of the segment 266 would put stress on the connection between the high voltage terminal end 254 and the positive high voltage terminal 58 without the cable bracket 36. In this way, the cable bracket 36 clamps the segment 262 to relieve the stresses on the high voltage terminal end 254 and the positive high voltage terminal 58.

As shown in FIGS. 3 and 6, the outer insulating layer 622 at the segment 262 is at least partially stripped to expose the shielding layer 618. In the example provided, the outer insulating layer 622 is stripped about the circumference of the segment 262 and the stripped portion of the segment 262 is entirely within the high voltage cable base arm 330 and the high voltage clamp arm 414.

As shown in FIG. 6, the protrusions 374, 434 of the high voltage cable base arm 330 and the high voltage clamp arm 414 contact the shielding layer 618. In the example provided, the mounting fastener 318 is in electrical communication with an electrical ground (e.g., the chassis of the vehicle 10), or a grounding circuit such that the clamp member 314, the base member 310, the clamp fastener 322, and the mounting fastener 318 provide an electrical pathway between the shielding layer 618 and the electrical ground.

As shown in FIG. 6, the low voltage power cable 270 includes a core 626, and an outer insulating layer 630. In the example provided, the low voltage power cable 270 does not include a shielding layer or an inner insulating layer. The core 626 is an electrically conductive material configured to transmit low voltage electrical power. The outer insulating layer 630 is concentrically disposed about the core 626 and is an electrically insulating material. In the example provided, the low voltage power cable 270 has an outermost diameter that is less than an outermost diameter of the high voltage power cable 250.

Returning to FIGS. 2 and 3, the low voltage terminal end 274 is attached to the positive low voltage terminal 50 and the core 626 (FIG. 6). The low voltage terminal end 274 is an electrically conductive material configured to conduct low voltage electrical power between the core 626 (FIG. 6) and the positive low voltage terminal 50. A segment 278 of the low voltage power cable 270 is attached to the low voltage terminal end 274 and bends or curves from the low voltage terminal end 274 to another segment 282 of the low voltage power cable 270. The segment 282 is received between the inner surfaces 380, 440 of the low voltage cable base arm 334 and the low voltage clamp arm 418 to be clamped therebetween. Another segment 286 of the low voltage power cable 270 bends or curves from the segment 282, to other components (not specifically shown) of the low voltage circuit 26, the low voltage system 46, and/or the control module 22. In the example shown, the segment 286 bends at approximately 90° to pass through the port 206 mounted to the bulkhead 202 of the vehicle 10.

In operation, the bend of the segment 278 and the bend of the segment 286 would put stress on the connection between the low voltage terminal end 274 and the positive low voltage terminal 50 without the cable bracket 36. In this way, the cable bracket 36 clamps the segment 282 to relieve the stresses on the low voltage terminal end 274 and the positive low voltage terminal 50. As shown in FIGS. 3 and 6, the outer insulating layer 630 of the low voltage power cable 270 is not stripped and insulates the core 626 from the cable bracket 36.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cable bracket comprising:
    a conductive base member including a mount portion, a high voltage cable base arm, and a base bridge, the mount portion being configured to be mounted to an electrical ground, the base bridge having an aperture and fixedly coupling the mount portion to the high voltage cable base arm, the high voltage cable base arm having a concave inner surface;
    a conductive clamp member including a high voltage cable clamp arm and a clamp bridge, the clamp bridge defining an aperture, the high voltage cable clamp arm being fixedly coupled to the clamp bridge and having a concave inner surface that opposes the concave inner surface of the high voltage cable base arm;
    a clamping fastener received through the apertures of the base bridge and the clamp bridge and securing the clamp member to the base member in electrical contact therewith; and
    at least one conductive protrusion extending radially inward from one of the concave inner surface of the high voltage cable base arm or the concave inner surface of the high voltage cable clamp arm.

2. The cable bracket of claim 1, further comprising a mounting fastener, wherein the mount portion includes an aperture, wherein the mounting fastener is received through the aperture of the base bridge to connect the mount portion to the electrical ground.

3. The cable bracket of claim 1, further comprising at least one conductive protrusion extending radially inward from the other one of the concave inner surface of the high voltage cable base arm or the concave inner surface of the high voltage cable clamp arm.

4. The cable bracket of claim 1, wherein the high voltage cable base arm and the mount portion extend from different sides of the base bridge.

5. The cable bracket of claim 4, wherein the high voltage cable base arm and the mount portion extend from sides of the base bridge that are perpendicular to one another.

6. The cable bracket of claim 1, wherein the base member includes a low voltage cable base arm and the clamp member includes a low voltage cable clamp arm, the low voltage cable base arm being fixedly coupled to the base bridge and having a concave inner surface, the low voltage cable clamp arm being fixedly coupled to the clamp bridge and having a concave inner surface that opposes the concave inner surface of the low voltage cable base arm.

7. The cable bracket of claim 6, wherein the concave inner surfaces of the high voltage cable base arm and the high voltage cable clamp arm have a radius of curvature, and the concave inner surfaces of the low voltage cable base arm and the low voltage cable clamp arm have a radius of curvature that is less than the radius of curvature of the high voltage cable base arm and the high voltage cable clamp arm.

8. The cable bracket of claim 6, wherein the concave inner surfaces of the low voltage cable base arm and the low voltage cable clamp arm are devoid of radially inward extending protrusions.

9. The cable bracket of claim 1, further comprising a prong that extends from one of the base member or the clamp member and is configured to engage a power source to inhibit movement of the cable bracket relative to the power source.

10. The cable bracket of claim 9, wherein the prong projects from one of the base bridge or the clamp bridge opposite from the mount portion.

11. A vehicle battery pack system comprising:
    a power source including a high voltage terminal and an electrical ground;
    a high voltage cable including a conductive core, a conductive shielding layer, an insulating layer disposed between the core and the shielding layer, and a high voltage terminal end that is attached to the core and the high voltage terminal; and
    a cable bracket including:
        a conductive base member including a mount portion, a high voltage cable base arm, and a base bridge, the mount portion mounted to the power source and coupled to the electrical ground for electrical communication therewith, the base bridge defining an aperture and fixedly coupling the mount portion to the high voltage cable base arm, the high voltage cable base arm having a concave inner surface;
        a conductive clamp member including a high voltage cable clamp arm and a clamp bridge, the clamp bridge includes an aperture, the high voltage cable clamp arm being fixedly coupled to the clamp bridge and having a concave inner surface that opposes the concave inner surface of the high voltage cable base arm, the high voltage cable being received between the concave inner surfaces of the high voltage cable base arm and the high voltage cable clamp arm;
        a clamping fastener received through the apertures of the base bridge and the clamp bridge and connecting the clamp member to the base member; and
        at least one protrusion extending radially inward from one of the concave inner surface of the high voltage cable base arm or the concave inner surface of the high voltage cable clamp arm and contacting the shielding layer.

12. The vehicle battery pack system of claim 11, further comprising a mounting fastener, wherein the mount portion defines an aperture, wherein the mounting fastener is received through the aperture of the mount portion to attach the mount portion to the power source.

13. The vehicle battery pack system of claim 11, further comprising at least one protrusion extending radially inward from the other one of the concave inner surface of the high voltage cable base arm or the concave inner surface of the high voltage cable clamp arm and contacting the shielding layer, wherein the at least one protrusion extending radially inward from the other one of the concave inner surface of the high voltage cable base arm or the concave inner surface of the high voltage cable clamp arm is coupled for electrical communication with the mount portion to transmit electricity between the shielding layer and the electrical ground.

14. The vehicle battery pack system of claim 11, wherein the high voltage cable base arm and the mount portion extend from different sides of the base bridge.

15. The vehicle battery pack system of claim 14, wherein the high voltage cable base arm and the mount portion extend from sides of the base bridge that are perpendicular to one another.

16. The vehicle battery pack system of claim 11, further comprising a low voltage cable that includes a conductive core, a low voltage terminal end, and an insulating layer that surrounds the core of the low voltage cable, wherein the power source includes a low voltage terminal and the low voltage terminal end is attached to the core of the low voltage cable and the low voltage terminal, wherein the base member includes a low voltage cable base arm and the clamp member includes a low voltage cable clamp arm, the low voltage cable base arm being fixedly coupled to the base bridge and having a concave inner surface, the low voltage cable clamp arm being fixedly coupled to the clamp bridge and having a concave inner surface that opposes the concave inner surface of the low voltage cable base arm, wherein the low voltage cable is received between the concave inner surfaces of the low voltage base arm and the low voltage clamp arm.

17. The vehicle battery pack system of claim 16, wherein the high voltage cable has an outermost diameter that is greater than an outermost diameter of the low voltage cable.

18. The vehicle battery pack system of claim 16, wherein the concave inner surfaces of the low voltage cable base arm and the low voltage cable clamp arm are devoid of radially inward extending protrusions.

19. The vehicle battery pack system of claim 11, further comprising a prong that extends from the cable bracket and engages the power source to inhibit movement of the cable bracket relative to the power source.

20. The vehicle battery pack system of claim 19, wherein the prong projects from one of the base bridge or the clamp bridge.

\* \* \* \* \*